United States Patent
Noldus

(10) Patent No.: US 12,261,817 B2
(45) Date of Patent: Mar. 25, 2025

(54) DOMAIN RESOLVING

(71) Applicant: Telefonaktiebolaget LM Ericsson (publ), Stockholm (SE)

(72) Inventor: Rogier August Caspar Joseph Noldus, Goirle (NL)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 124 days.

(21) Appl. No.: 17/779,188

(22) PCT Filed: Nov. 29, 2019

(86) PCT No.: PCT/EP2019/083177
§ 371 (c)(1),
(2) Date: May 24, 2022

(87) PCT Pub. No.: WO2021/104653
PCT Pub. Date: Jun. 3, 2021

(65) Prior Publication Data
US 2022/0417209 A1    Dec. 29, 2022

(51) Int. Cl.
*H04L 61/4511* (2022.01)
*H04L 65/1104* (2022.01)

(52) U.S. Cl.
CPC ...... *H04L 61/4511* (2022.05); *H04L 65/1104* (2022.05)

(58) Field of Classification Search
CPC .......... H04L 61/4511; H04L 65/1104
USPC .......... 709/245
See application file for complete search history.

(56) References Cited

U.S. PATENT DOCUMENTS

2003/0225912 A1* 12/2003 Takeda ............ H04L 65/1101
                                                         709/246
2006/0227758 A1* 10/2006 Rana ............. H04L 47/2416
                                                         370/351

FOREIGN PATENT DOCUMENTS

WO    2008058568 A1    5/2008

OTHER PUBLICATIONS

Rotherberg et al. "SIP over an Identifier/Locator Splitted Next Generation Internet Architecture." 2008 10th International Conference on Advanced Communication Technology. IEEE. Feb. 17, 2008. pp. 621-626 (Year: 2008).*

(Continued)

*Primary Examiner* — Jeffrey R Swearingen
(74) *Attorney, Agent, or Firm* — Weisberg I.P. Law, P.A.

(57) ABSTRACT

There is provided a method performed by a first session initiation protocol (SIP) server (10) of a network (300). The method comprises initiating transmission of a SIP message (302, 304) towards a node (20) at an edge of the network (300). The SIP message (302, 304) comprises a domain name and a directive for resolving the domain name to identify one or more internet protocol (IP) addresses of a second SIP server to which the SIP message (302, 304) is to be sent.

17 Claims, 10 Drawing Sheets

(56) References Cited

OTHER PUBLICATIONS

Baldi et al. "ALEX: improving SIP support in systems with multiple network addresses." Proceedings of the Fifth IEEE International Symposium on Signal Processing and Information Technology. Dec. 21, 2005. IEEE Press. pp. 164-169. (Year: 2005).*
Gurbani et al. "SIP: A routing protocol." Bell Labs Technical Journal. vol. 6 Issue 2, 2002. pp. 136-152. (Year: 2002).*
GSM Association, "IMS Roaming & Interworking Guidelines 3.5", Official Document IR.65, XP-002442563, Aug. 14, 2016, 1-34.
Rogier, Noldus, et al., "Operator-independent public user identities for IP multimedia communication services for enterprises", 2011 15th International Conference on Intelligence in Next Generation Networks, 2011, 181-186.

* cited by examiner

DOMAIN RESOLVING

TECHNICAL FIELD

The disclosure relates to methods for domain resolving. The disclosure also relates to a server and a node configured to operate in accordance with those methods.

BACKGROUND

There exist various forms of internet protocol (IP) based communication systems. Examples of such systems include an IP multimedia subsystem (IMS) network of an operator, an enterprise voice over IP (VoIP) network and a hosted services domain. Various forms of communication session establishment used in these systems comprise the routing of signalling messages. This routing is often based on domain names, which need to be resolved. An example of domain name resolving includes the use of a domain name system (DNS) server to resolve a domain name.

There are two categories of DNS server, which are an internal DNS (iDNS) server and external DNS (eDNS) server. An iDNS server is used for resolving domains that are associated with functional entities within an IP based communication system, while an eDNS server is used for resolving domains that are associated with functional entities outside an IP based communication system. An iDNS server may be accessed strictly by functional entities within the same domain as the domain in which the iDNS resides, such as an IP based communication system, only. A functional entity within an IP based communication system, such as an IMS, is configured with an address of the iDNS server. DNS queries are sent towards that iDNS server. Functional entities at the border of the IP based communication system may be configured with both the address of an iDNS server and the address of an eDNS server. Within the context of an IP based communications network, the iDNS server is typically accessed for domain resolving during inbound traffic, while the eDNS server is typically accessed for domain resolving during outbound traffic.

FIG. 1 illustrates an example that uses an eDNS server for domain resolving. In the example of FIG. 1, an interconnect border control function (IBCF) node applies domain resolving for an external domain (ibcf.ims.mnc025.mcc334.3gpp-network.org) and thus it applies an eDNS query. The IBCF node is typically configured to direct eDNS queries to a particular DNS server within its own domain. The eDNS of this domain is configured to apply an iterative DNS query towards external DNS servers. This implies that the eDNS server of this domain does not need to contain the required resource record(s) for the requested domain. The eDNS server can forward the query towards a DNS server in the public domain, as appropriate, for the layered DNS domain resolving methodology.

FIG. 2 illustrates an example of an IBCF that uses an iDNS server for domain resolving. In the example of FIG. 2, the same IBCF node as in the example illustrated in FIG. 1 receives a session initiation protocol (SIP) Invite request destined for a subscriber of the communication services network to which the IBCF node belongs. The IBCF node applies internal service logic processing to determine that the SIP Invite request is to be forwarded towards an interrogating call session control function (I-CSCF) node. This is reflected by the domain in the Route header in the SIP Invite request sent by the IBCF node. The domain in this example is icscf.ims.mnc020.mcc334.3gppnetwork.org. The IBCF node is configured to apply iDNS based domain resolving, since the domain is an internal domain. The IBCF node is configured to direct iDNS queries to a particular DNS server within its own domain.

Generally, for an IBCF node, the decision of whether to apply an iDNS query or an eDNS query is based on any one of a first rule and a second rule. The first rule is that, for the routing of a message towards a destination outside the network of the IBCF node (i.e. for egress routing), the IBCF node is to query an eDNS, whilst for the routing of a message towards a destination inside the network of the IBCF node (i.e. for ingress routing) the IBCF node is to query an iDNS. The second rule is that, for resolving a domain belonging to the network of the IBCF node, the IBCF node is to query an iDNS, otherwise the IBCF node is to query an eDNS. It will be understood that this is only one example and that there are many other situations whereby a functional entity in an IMS network, or other class of communications network, may need to determine whether to apply an iDNS query or an eDNS query.

There may be a situation in which a node in an IMS network (such as an IBCF node or other node in the IMS network) or a node in a network other than an IMS, is unable to base the decision of whether to apply an iDNS query or an eDNS query on the domain itself or on the direction of the message. This situation may, for example, occur when a border function node (such as an IBCF node), has to route a session initiation protocol (SIP) message towards a SIP proxy or a SIP server, whereby the proxy or server is known only by its IP address or by a set of IP addresses. It is common in SIP based routing, especially for session establishment and for stand-alone transactions, to identify a destination for a message with a domain. The functional entity that is responsible for routing the SIP message towards the destination resolves the domain into one or more IP addresses, so that it can route the message. In order to facilitate domain based routing for a case that only an IP address, or a set of IP addresses, is known for the destination, a virtual domain can be assigned to the IP address or the set of IP addresses. This virtual domain can be referred to as "assigned_domain". Regular domain resolving can then be applied, resulting in the one or more IP addresses. The one or more IP addresses must be provisioned in a DNS.

FIG. 3 illustrates an example of this form of domain resolving. In the example illustrated in FIG. 3, the IBCF node applies DNS resolving of assigned_domain, so that it can route a SIP message. The assigned_domain is typically assigned within the domain from which the routing is initiated. This domain may, for example, be a private IMS domain, or a hosted IMS services domain. However, the destination of the SIP message in the example illustrated in FIG. 3 is a SIP server in another domain. A problem occurs due to the fact that the assigned_domain is assigned by a different domain than the domain to which the one or more IP addresses belong. It is then questionable which DNS can resolve the assigned_domain.

In this respect, the eDNS server is probably not suitable as the eDNS server is intended to resolve domains outside the domain of the network of the eDNS server; one IMS network (e.g. private network, hosted services network, etc.) is not able to influence the DNS administered in another domain. With regard to the iDNS server, the network in question (e.g. private network, hosted services network, etc.) has control over its own iDNS server and thus may administer it. A dilemma is caused by two aspects of this message routing. The first aspect is that the message for which the domain resolving is required is an outbound message (i.e.

destined for an external recipient) and, for an IBCF node, this constitutes egress routing. The second aspect is that the assigned_domain is typically a domain outside the network of the sending entity (i.e. it does not belong to the one or more domains for which the network of the sending entity is responsible). These two aspects have the effect that the sending entity will, by default, apply an eDNS based domain resolving, whilst the assigned_domain is expected to be provisioned in an iDNS.

A possible solution is to configure a border node (such as an IBCF node) with an eDNS address that is in fact the address of the iDNS server. However, the issue with this solution is that it affects all eDNS server queries, which is not acceptable. Another issue with this solution is that a border node (such as an IBCF node) may use a different IP termination (e.g. an Ethernet card) for an eDNS server than for an iDNS server. An iDNS server may not accept a DNS query from an IP termination from a border node, when that IP termination is meant for an eDNS server. Another possible solution is to use an internal domain for the assigned_ domain. Based on the assigned_domain, the border node will decide to use an iDNS server. However, an issue still exists in that an external SIP server receives a SIP message that comprises a request comprising a uniform resource identifier (R-URI) or a Route header, as appropriate, that points to a different domain than the domain to which the external SIP server belongs. There is thus an ambiguity, for the cases as described above, as to whether the border node is to select an iDNS server or an eDNS server for domain resolving.

There is thus a need for an improved technique, which is aimed at addressing at least some of the problems associated with existing algorithms.

SUMMARY

It is an object of the disclosure to obviate or eliminate at least some of the above-described disadvantages associated with existing techniques and provide an improved technique for domain resolving.

Therefore, according to an aspect of the disclosure, there is provided a method performed by a first session initiation protocol (SIP) server of a network. The method comprises initiating transmission of a SIP message towards a node at an edge of the network. The SIP message comprises a domain name and a directive for resolving the domain name to identify one or more internet protocol (IP) addresses of a second SIP server to which the SIP message is to be sent.

There is thus provided an improved method for domain resolving. In particular, a first SIP server can use any domain name (e.g. in the R-URI or Route header), as appropriate, and provide a directive for (e.g. the DNS that is to be used for) the resolving of that domain name.

In some embodiments, the second SIP server may be internal to the network. In this way, the first SIP server can still provide a directive (e.g. an indication of which DNS is to be used) for the resolving of the domain name (e.g. used in the R-URI or in the Route header). In other embodiments, the second SIP server may be external to the network. In this way, it can be ensured that the first SIP server can use a domain name (e.g. in the R-URI or in the Route header), that is understood by the second SIP server, whilst the domain name (e.g. in the R-URI or in the Route header) can be resolved (e.g. using a DNS) within the same domain as the first SIP server, for example.

In some embodiments, the directive may be indicative of a domain name system (DNS) server to be queried for the domain name to be resolved. In this way, the first SIP server may provide an explicit indication of which DNS, e.g. an iDNS or eDNS, is to be used to resolve the domain name. For example, the explicit indication may be that iDNS is to be used whilst the domain name to be resolved may actually point to an external DNS, or the first SIP server may provide an explicit indication that eDNS is to be used whilst the domain name to be resolved may actually point to an internal DNS.

In some embodiments, the directive may comprise any one or more of: an indication of whether a DNS server to be queried to resolve the domain name is internal to the network or external to the network, an address of the DNS server to be queried to resolve the domain name, a domain within which the DNS server is to be queried to resolve the domain name, and one or more resource records associated with the domain name to be resolved. In this way, the first SIP server has full control over the usage of DNS server to be used for resolving the domain name (e.g. in the R-URI domain or Route header).

In some embodiments, the DNS server may be internal to the network. In this way, iDNS is used for domain resolving, whilst the domain name to be resolved may point to an external DNS. In other embodiments, the DNS server may be external to the network. In this way, eDNS is used for domain resolving, whilst the domain name to be resolved may point to an internal DNS.

In some embodiments, the domain name may be a fully qualified domain name (FQDN). In this way, the first SIP server may indicate that domain resolving, for the domain name (e.g. contained in the R-URI or Route header), can be performed by any specific entity (e.g. any specific DNS), not necessarily being the designated entity (e.g. the designated iDNS server or the designated eDNS server). For example, a DNS server to be used for resolving the domain name (e.g. contained in the R-URI or Route header), can be a dedicated DNS server for this purpose. This dedicated DNS server may, in an embodiment, be comprised in the first SIP server.

According to another aspect of the disclosure, there is provided a first SIP server of a network. The first SIP server comprises processing circuitry configured to operate in accordance with the method described earlier in respect of the first SIP server. In some embodiments, the first SIP server may comprise at least one memory for storing instructions which, when executed by the processing circuitry, cause the first SIP server to operate in accordance with the method described earlier in respect of the first SIP server. The first SIP server thus provides the advantages discussed earlier in respect of the method performed by the first SIP server.

According to another aspect of the disclosure, there is provided a method performed by a node at an edge of a network. The method comprises receiving a session initiation protocol (SIP) message from a first SIP server of the network. The SIP message comprises a domain name and a directive for resolving the domain name. The method comprises resolving the domain name using the directive to identify one or more internet protocol (IP) addresses of a second SIP server to which the SIP message is to be sent.

There is thus provided an improved method for domain resolving. In particular, domain name resolving may be performed by an entity (e.g. a DNS server) other than the entity (e.g. DNS server) normally derived from the domain name to be resolved or from the direction of the message for which the domain name resolving is required.

In some embodiments, the method may comprise initiating transmission of the SIP message towards the identified second SIP server. In this way, the SIP message can be sent towards its intended destination.

In some embodiments, the second SIP server may be internal to the network. In this way, a directive (e.g. an indication of which DNS is to be used) can still be provided to the node at the edge of the network for the resolving of the domain name (e.g. used in the R-URI or in the Route header). In other embodiments, the second SIP server may be external to the network. In this way, it can be ensured that the domain name (e.g. in the R-URI or in the Route header) is one that is understood by the second SIP server, whilst the domain name (e.g. in the R-URI or in the Route header) can be resolved (e.g. using a DNS) within the same domain as the first SIP server, for example.

In some embodiments, the directive may be indicative of a domain name system (DNS) server to be queried for the domain name to be resolved. In this way, the node at the edge of a network may be provided with an explicit indication of which DNS, e.g. an iDNS or eDNS, is to be used to resolve the domain name. For example, the explicit indication may be that iDNS is to be used whilst the domain name to be resolved may actually point to an external DNS, or the explicit indication may be that eDNS is to be used whilst the domain name to be resolved may actually point to an internal DNS.

In some embodiments, the directive may comprise any one or more of an indication of whether a DNS server to be queried to resolve the domain name is internal to the network or external to the network, an address of the DNS server to be queried to resolve the domain name, a domain within which the DNS server is to be queried to resolve the domain name, and one or more resource records associated with the domain name to be resolved. In this way, there is full control over the usage of DNS server to be used to resolve the domain name (e.g. in the R-URI domain or Route header).

In some embodiments, the DNS server may be internal to the network. In this way, iDNS is used for domain resolving, whilst the domain name to be resolved may point to an external DNS. In other embodiments, the DNS server may be external to the network. In this way, eDNS is used for domain resolving, whilst the domain name to be resolved may point to an internal DNS.

In some embodiments, the domain name may be a fully qualified domain name (FQDN). In this way, the first SIP server may indicate that domain resolving, for the domain name (e.g. contained in the R-URI or Route header), can be performed by any specific entity (e.g. any specific DNS), not necessarily being the designated entity (e.g. the designated iDNS server or the designated eDNS server). For example, a DNS server to be used to resolve the domain name (e.g. contained in the R-URI or Route header), can be a dedicated DNS server for this purpose. This dedicated DNS server may, in an embodiment, be comprised in the first SIP server.

According to another aspect of the disclosure, there is provided a node at an edge of a network. The node comprises processing circuitry configured to operate in accordance with the method described above in respect of the node at the edge of the network. In some embodiments, the node may comprise at least one memory for storing instructions which, when executed by the processing circuitry, cause the node to operate in accordance with the method described above in respect of the node at the edge of the network. The node at the edge of the network thus provides the advantages discussed earlier in respect of the method performed by the node at the edge of the network.

According to another aspect of the disclosure, there is provided a network. The network comprises at least one first SIP server as described earlier and at least one node as described earlier at an edge of the network. The network thus provides the advantages discussed earlier in respect of the method performed by the first SIP server and the node at the edge of the network.

According to another aspect of the idea, there is provided a computer program comprising instructions which, when executed by processing circuitry, cause the processing circuitry to perform the method described earlier. The computer program thus provides the advantages discussed earlier in respect of the method performed by the first SIP server and the node at the edge of the network.

According to another aspect of the idea, there is provided a computer program product, embodied on a non-transitory machine-readable medium, comprising instructions which are executable by processing circuitry to cause the processing circuitry to perform the method described earlier. The computer program product thus provides the advantages discussed earlier in respect of the method performed by the first SIP server and the node at the edge of the network.

Therefore, an advantageous technique for domain resolving is provided.

BRIEF DESCRIPTION OF THE DRAWINGS

For a better understanding of the technique, and to show how it may be put into effect, reference will now be made, by way of example, to the accompanying drawings, in which.

DETAILED DESCRIPTION

As mentioned earlier, an advantageous technique for domain resolving is provided. This technique is implemented by a first session initiation protocol (SIP) server of a network and a node at an edge of the network. The network referred to herein can, for example, be a communication network, such as an internet protocol (IP) based communication network. Examples of such a network include, but are not limited to, an IP multimedia subsystem (IMS) network, a voice over IP (VoIP) network, a hosted services domain network, or similar.

Figure 1:
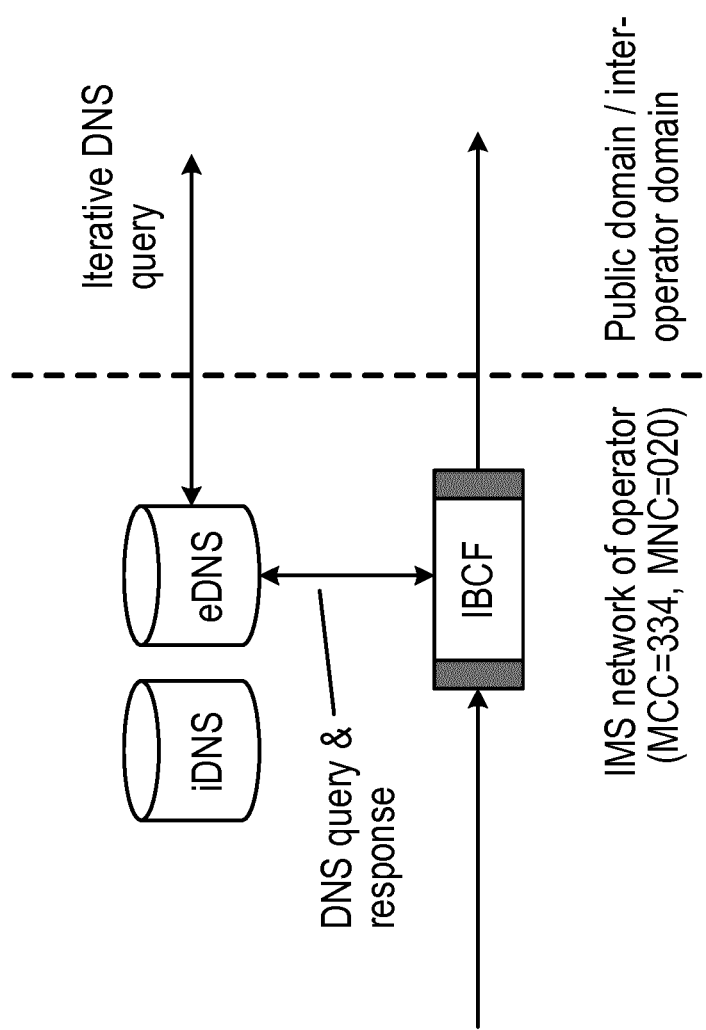
FIG. 1 is a block diagram illustrating a network.
Figure 2:
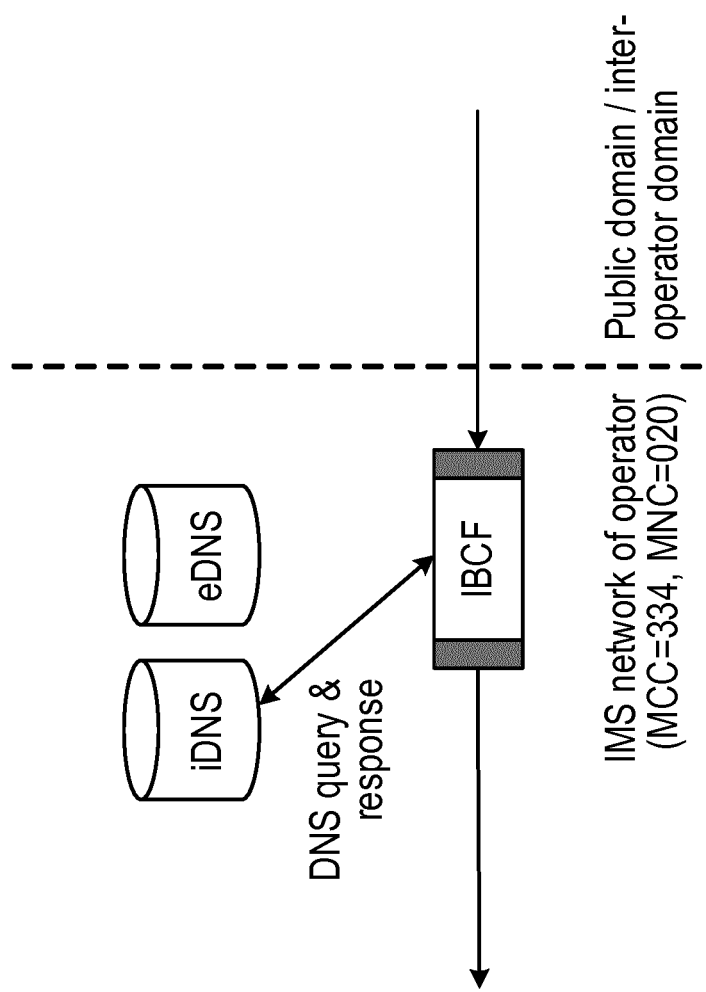
FIG. 2 is a block diagram illustrating a network.
Figure 3:
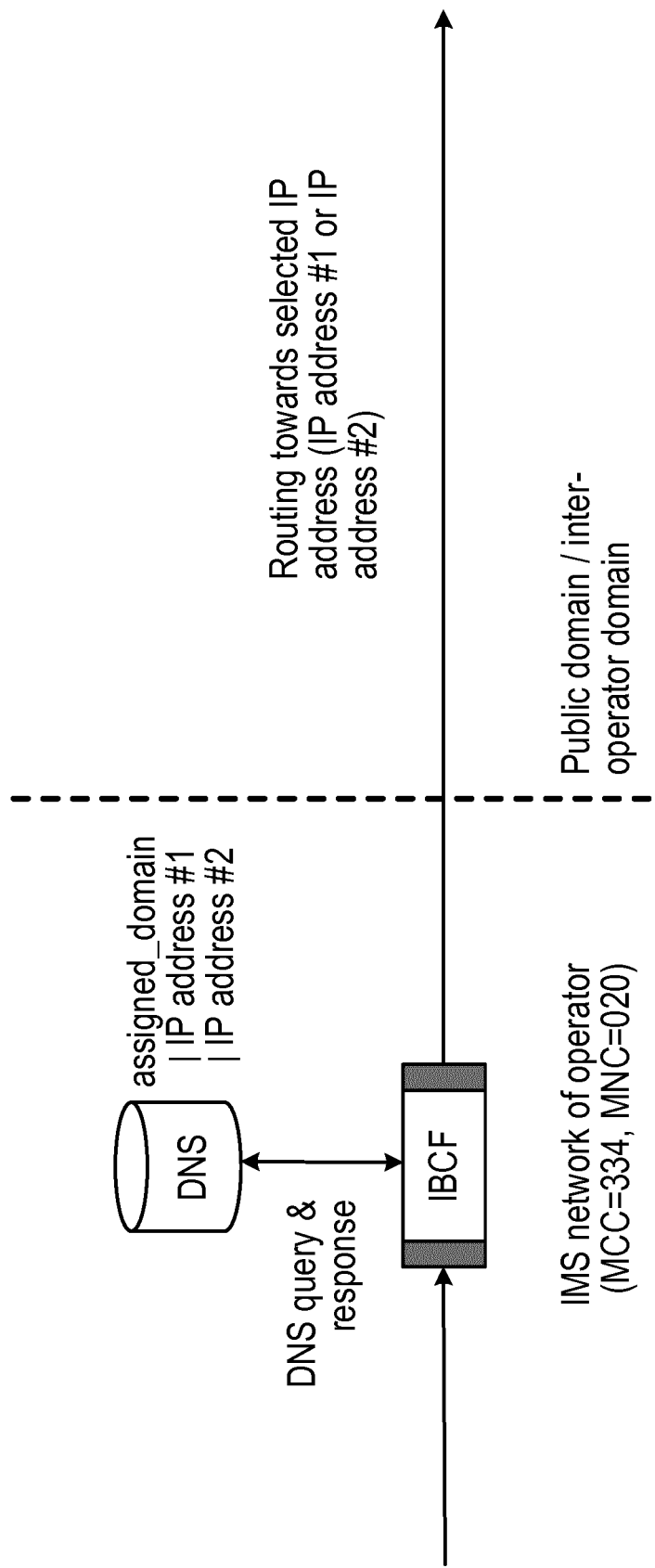
FIG. 3 is a block diagram illustrating a network.
Figure 4:
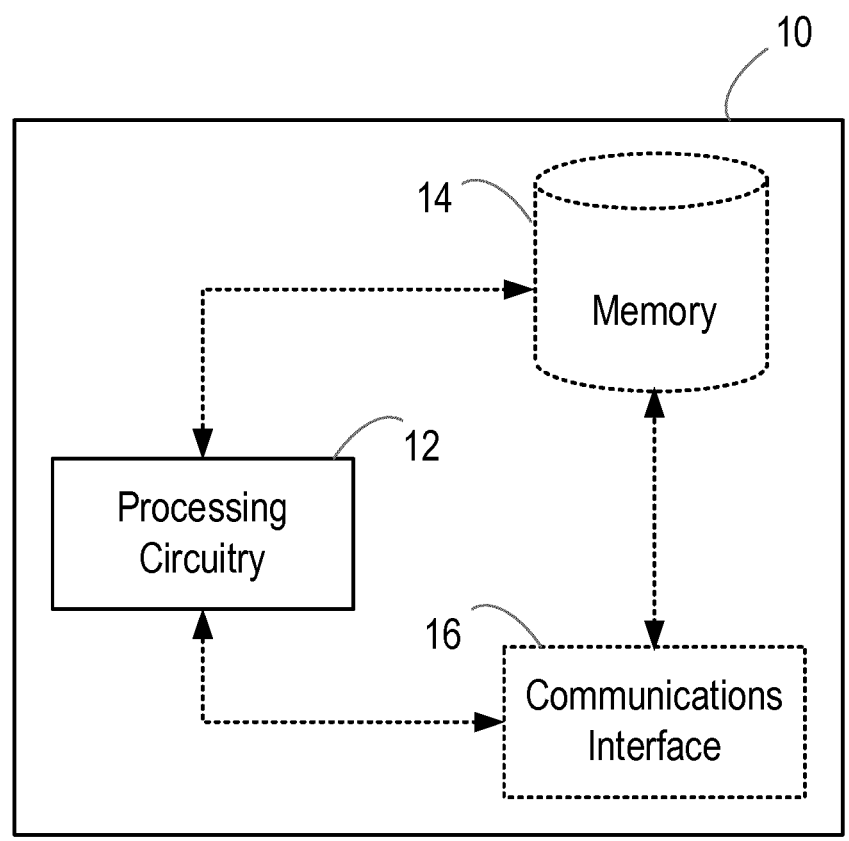
FIG. 4 is a block diagram illustrating a first session initiation protocol server of a network according to an embodiment.

FIG. 4 illustrates a first SIP server 10 of a network in accordance with an embodiment. The first SIP server 10 is for resolving a domain. In some embodiments, the first SIP server described herein may be a SIP application server (SIP AS).

As illustrated in FIG. 4, the first SIP server 10 comprises processing circuitry (or logic) 12. The processing circuitry 12 controls the operation of the first SIP server 10 and can implement the method described herein. The processing circuitry 12 can comprise one or more processors, processing units, multi-core processors or modules that are configured or programmed to control the first SIP server 10 in the manner described herein. In particular implementations, the processing circuitry 12 of the first SIP server 10 can comprise a plurality of software and/or hardware modules that are each configured to perform, or are for performing, individual or multiple steps of the method described herein.

Briefly, the processing circuitry 12 of the first SIP server 10 is configured to initiate transmission of a SIP message towards a node at an edge of the network. The SIP message comprises a domain name and a directive for resolving the domain name to identify one or more internet protocol (IP) addresses of a second SIP server to which the SIP message is to be sent. Herein, the term "initiate" can mean, for example, cause or establish. Thus, the processing circuitry 12 of the first SIP server 10 can be configured to itself transmit the SIP message towards the node at the edge of the network or can be configured to cause another entity (e.g. server or node) of the network to transmit the SIP message towards the node at the edge of the network.

As illustrated in FIG. 4, in some embodiments, the first SIP server 10 may optionally comprise a memory 14. The memory 14 of the first SIP server 10 can comprise a volatile memory or a non-volatile memory. In some embodiments, the memory 14 of the first SIP server 10 may comprise a non-transitory media. Examples of the memory 14 of the first SIP server 10 include, but are not limited to, a random access memory (RAM), a read only memory (ROM), a mass storage medium such as a hard disk, a removable storage media such as a compact disk (CD) or a digital video disk (DVD), and/or any other memory.

The processing circuitry 12 of the first SIP server 10 can be connected to the memory 14 of the first SIP server 10. In some embodiments, the memory 14 of the first SIP server 10 may be for storing program code or instructions which, when executed by the processing circuitry 12 of the first SIP server 10, cause the first SIP server 10 to operate in the manner described herein in respect of the first SIP server 10. For example, in some embodiments, the memory 14 of the first SIP server 10 may be configured to store program code or instructions that can be executed by the processing circuitry 12 of the first SIP server 10 to cause the first SIP server 10 to operate in accordance with the method described herein in respect of the first SIP server 10. Alternatively or in addition, the memory 14 of the first SIP server 10 can be configured to store any messages, requests, responses, indications, information, data, notifications, signals, or similar, that are described herein. The processing circuitry 12 of the first SIP server 10 may be configured to control the memory 14 of the first SIP server 10 to store any messages, requests, responses, indications, information, data, notifications, signals, or similar, that are described herein.

In some embodiments, as illustrated in FIG. 4, the first SIP server 10 may optionally comprise a communications interface 16. The communications interface 16 of the first SIP server 10 can be connected to the processing circuitry 12 of the first SIP server 10 and/or the memory 14 of first SIP server 10. The communications interface 16 of the first SIP server 10 may be operable to allow the processing circuitry 12 of the first SIP server 10 to communicate with the memory 14 of the first SIP server 10 and/or vice versa. Similarly, the communications interface 16 of the first SIP server 10 may be operable to allow the processing circuitry 12 of the first SIP server 10 to communicate with a node at an edge of the network and/or any other node of the network. The communications interface 16 of the first SIP server 10 can be configured to transmit and/or receive any messages, requests, responses, indications, information, data, notifications, signals, or similar, that are described herein. In some embodiments, the processing circuitry 12 of the first SIP server 10 may be configured to control the communications interface 16 of the first SIP server 10 to transmit and/or receive any messages, requests, responses, indications, information, data, notifications, signals, or similar, that are described herein.

Although the first SIP server 10 is illustrated in FIG. 4 as comprising a single memory 14, it will be appreciated that the first SIP server 10 may comprise at least one memory (i.e. a single memory or a plurality of memories) 14 that operate in the manner described herein. Similarly, although the first SIP server 10 is illustrated in FIG. 4 as comprising a single communications interface 16, it will be appreciated that the first SIP server 10 may comprise at least one communications interface (i.e. a single communications interface or a plurality of communications interface) 16 that operate in the manner described herein. It will also be appreciated that FIG. 4 only shows the components required to illustrate an embodiment of the first SIP server 10 and, in practical implementations, the first SIP server 10 may comprise additional or alternative components to those shown.

In some embodiments, the first SIP server 10 described herein may use the capabilities of an execution platform (e.g. on top of which an application may be deployed) for the SIP routing. One example of such an execution platform is known in the art as the SIP container mechanism. This mechanism provides a set of primitives for SIP message routing. The first SIP server 10 may, for example, provide the SIP message to the execution platform and instruct the platform to route the message in the manner described herein. Thus, in some embodiments, the domain resolving described herein may be performed by an execution platform. The set of primitives that are provided for SIP message routing may comprise the capability to include the directive described herein. The SIP container may then execute the domain resolving in accordance with the directive.

The second SIP server referred to herein may comprise the same components of the first SIP server 10, as described with reference to FIG. 4. In some embodiments, the second SIP server referred to herein may be internal to the network. In other embodiments, the second SIP server referred to herein may be external to the network. In some embodiments, the second SIP server referred to herein may be a SIP application server (SIP AS).

Figure 5:
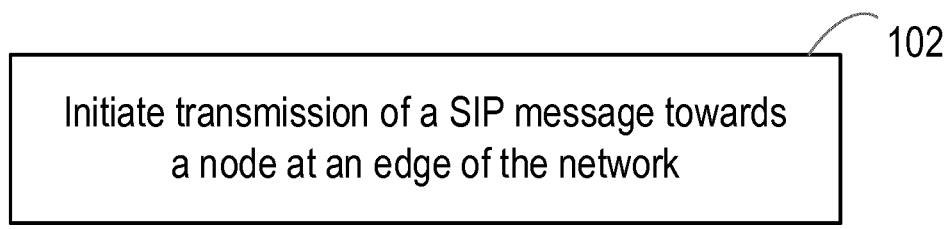
FIG. 5 is a block diagram illustrating a method performed by a first session initiation protocol server of a network according to an embodiment.

FIG. 5 is a flowchart illustrating a method performed by a first SIP server 10 in accordance with an embodiment. The method is for (use in) resolving a domain. The first SIP server 10 described earlier with reference to FIG. 4 is configured to operate in accordance with the method of FIG. 5. The method can be performed by or under the control of the processing circuitry 12 of the first SIP server 10.

As illustrated at block 200 of FIG. 5, transmission of a SIP message towards a node at an edge of the network is initiated. More specifically, the processing circuitry 12 of the first SIP server 10 initiates (e.g. via the communications interface 16 of the first SIP server 10) this transmission of the SIP message. The SIP message may be a SIP signalling message according to some embodiments.

As mentioned earlier, the SIP message comprises a domain name and a directive for resolving the domain name to identify one or more IP addresses of a second SIP server to which the SIP message is to be sent. This second SIP server referred to herein can be a target for the SIP message or a next hop for the SIP message. The one or more IP addresses of the second SIP server are associated with the domain name. In some embodiments, the domain name can be a fully qualified domain name (FQDN). In some embodiments, the directive may be for resolving the domain name to identify one or more IP addresses of more than one second SIP server to which the SIP message is to be sent.

In some embodiments, the directive referred to herein may be indicative of a domain name system (DNS) server to be queried for the domain name to be resolved. Thus, according to some embodiments, the directive can indicate the DNS that is to be used for resolving the domain name. In some embodiments, the DNS server referred to herein may be internal to the network, i.e. the DNS server referred to herein may be an internal DNS (iDNS) server. In other embodiments, the DNS server referred to herein may be external to the network, i.e. the DNS server referred to herein may be an external DNS (eDNS) server). In this way, a domain name that is not part of the domain (e.g. not part of the IMS domain) of the network can be resolved by an iDNS server without affecting the capability to resolve other domain names that are not part of the domain of the network and that need to be resolved through an eDNS server.

In some embodiments, the directive referred to herein may comprise an indication of whether a DNS server to be queried to resolve the domain name is internal to the network (i.e. is an iDNS server) or external to the network (i.e. is an eDNS server). For example, in some embodiments, the processing circuitry 12 of the first SIP server 10 may determine that, for egress routing of the SIP message, a DNS server internal to the network is to be used to resolve the domain name in the SIP message.

An example of the SIP message according to such an embodiment is, as follows:

Invite sip:+1-800-1234@f.q.d.n.com; dns=iDNS SIP/2.0, where f.q.d.n.com is the domain name and dns=iDNS is the directive for resolving the domain name to identify one or more IP addresses of a second SIP server to which the SIP message is to be sent. In this example, the directive comprises an indication that the DNS server to be queried to resolve the domain name is internal to the network, i.e. is an internal DNS (iDNS) server.

Alternatively or in addition, in some embodiments, the directive referred to herein may comprise an address of the DNS server to be queried to resolve the domain name. Thus, in some embodiments, the first SIP server 10 may provide the address of the DNS server that is to be used, e.g. the address of an iDNS server. In some embodiments, the address of the DNS server may be one or more IP (e.g. IPv4) addresses of the DNS server. In some embodiments, the DNS server may be one or more IP (e.g. IPv4) address of the DNS server with a port number. In some embodiments, multiple IP addresses may be provided for the DNS server in this manner, since the DNS server may have multiple DNS IP addresses configured.

An example of the SIP message according to such an embodiment is, as follows:

Invite sip:+1-800-1234@f.q.d.n.com; dns=192.168.2.155:53,192.168.2.156:53 SIP/2.0, where f.q.d.n.com is the domain name and dns=192.168.2.155:53,192.168.2.156:53 is the directive for resolving the domain name to identify one or more IP addresses of a second SIP server to which the SIP message is to be sent. In this example, the directive comprises an address (or, more specifically, an IP address) of the DNS server to be queried to resolve the domain name.

Alternatively or in addition, in some embodiments, the directive referred to herein may comprise a domain within which the DNS server is to be queried to resolve the domain name. In some of these embodiments, the directive may comprise another domain name (e.g. an FQDN) indicative of the domain within which the DNS server is to be queried to resolve the domain name. Thus, in some embodiments, the first SIP server 10 may provide a domain within which the domain resolving is to be performed. For example, when the first SIP server 10 is logically contained within the domain service host.ims.operator.com and a SIP message that needs to be egress routed contains this same domain, service-host.ims.operator.com, then the node 20 at the edge of the network is to use DNS settings that are configured for this domain (the host\s own domain). This implies that a DNS server internal to the network (i.e. an iDNS server) is to be used. The host may also have DNS settings for the domain 3gppnetwork.org. This domain constitutes a generic domain for SIP message routing within third generation partnership project (3GPP) network operators. For this domain, the DNS settings may, for example, comprise pointing to a DNS server that is operated by a consortium of 3GPP network operators, such as the IP Exchange (IPX).

An example of the SIP message according to such an embodiment is, as follows:

Invite sip:+1-800-1234@f.q.d.n.com; dns="ims-service-node.operator.com" SIP/2.0, where f.q.d.n.com is the domain name and dns="ims-service-node.operator.com" is the directive for resolving the domain name to identify one or more IP addresses of a second SIP server to which the SIP message is to be sent. In this example, the directive comprises a domain within which the DNS server is to be queried to resolve the domain name.

Alternatively or in addition, in some embodiments, the directive referred to herein may comprise one or more resource records associated with the domain name to be resolved. Thus, in some embodiments, the first SIP server 10 may include the actual resource record(s) associated with the domain contained in the SIP message, e.g. as a parameter for the SIP message. For example, the first SIP server 10 may provide a request for a uniform resource identifier (R-URI) in the SIP message and this R-URI may contain the a domain for egress routing to a particular external server, whereby the domain is actually not aligned with the IP address (or IP addresses) to which this domain is to be resolved. That is, the domain is internal to the domain to which the first SIP server belongs, while the IP address (or IP addresses) belongs (or belongs) to an external domain.

This will be explained in more detail with respect to two examples. The first example is where a domain to be used for egress routing is an external domain and the domain is resolved through an eDNS server, which provides one or more IP addresses that belong to the external domain. The second example is where a domain to be used for ingress routing, or in general for internal routing, is an internal domain and the domain is resolved through an iDNS server, which provides one or more IP addresses that belong to this domain. For these examples, the application that places the domain in the R-URI does not have knowledge of the IP address(es) to which the domain is to be resolved. The iDNS server and eDNS server, as appropriate, are responsible for that.

According to these two examples, the domain that is placed in the R-URI fits in neither of the two main cases. The differences that apply are that, whilst the domain is an internal domain, the associated one or more IP addresses are external and the associated one or more IP addresses are provisioned in the first SIP server 10 (and possibly also in the DNS server), as opposed to being provisioned only in the DNS server. Hence, since the one or more IP addresses do not fit in the iDNS server or in the eDNS server, and since the first SIP server 10 is, in a way, the owner of the one or more IP addresses, the first SIP server 10 may provide the one or more resource records containing the one or more IP addresses, along with the domain in the R-URI.

An example of the SIP message according to such an embodiment is, as follows:

Invite sip:+1-800-1234@f.q.d.n.com; dns=<A-Record>, <A-Record>SIP/2.0, where f.q.d.n.com is the domain name and dns=<A-Record>,<A-Record> is the directive for resolving the domain name to identify one or more IP addresses of a second SIP server to which the SIP message is to be sent. In this example, the directive comprises a resource record associated with the domain name to be resolved.

Figure 6:
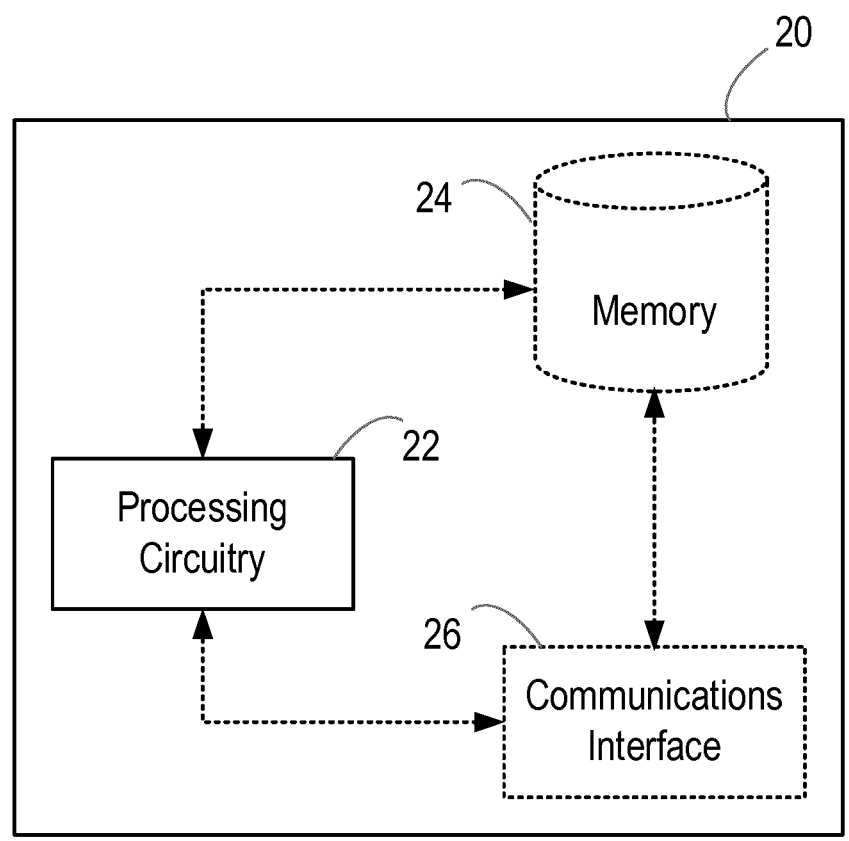
FIG. 6 is a block diagram illustrating a node at an edge of a network according to an embodiment.

FIG. 6 illustrates a node 20 of a network in accordance with an embodiment. The node 20 is for resolving a domain. The node 20 is a node at an edge (or a boundary) of the network. The node 20 may thus be referred to as an edge (or a boundary) node of the network. In some embodiments, the node 20 described herein at the edge of the network may be an interconnect border control function (IBCF) node.

As illustrated in FIG. 6, the node 20 comprises processing circuitry (or logic) 22. The processing circuitry 22 controls the operation of the node 20 and can implement the method described herein. The processing circuitry 22 can comprise one or more processors, processing units, multi-core processors or modules that are configured or programmed to control the node 20 in the manner described herein. In particular implementations, the processing circuitry 22 of the node 20 can comprise a plurality of software and/or hardware modules that are each configured to perform, or are for performing, individual or multiple steps of the method described herein.

Briefly, the processing circuitry 22 of the node 20 is configured to receive a SIP message from a first SIP server 10 of the network. The SIP message comprises a domain name and a directive for resolving the domain name. The processing circuitry 22 of the node 20 is configured to resolve the domain name using the directive to identify one or more IP addresses of a second SIP server to which the SIP message is to be sent.

As illustrated in FIG. 6, in some embodiments, the node 20 may optionally comprise a memory 24. The memory 24 of the node 20 can comprise a volatile memory or a non-volatile memory. In some embodiments, the memory 24 of the node 20 may comprise a non-transitory media. Examples of the memory 24 of the node 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the node 20 can be connected to the memory 24 of the node 20. In some embodiments, the memory 24 of the node 20 may be for storing program code or instructions which, when executed by the processing circuitry 22 of the node 20, cause the node 20 to operate in the manner described herein in respect of the node 20. For example, in some embodiments, the memory 24 of the node 20 may be configured to store program code or instructions that can be executed by the processing circuitry 22 of the node 20 to cause the node 20 to operate in accordance with the method described herein in respect of the node 20. Alternatively or in addition, the memory 24 of the node 20 can be configured to store any messages, requests, responses, indications, information, data, notifications, signals, or similar, that are described herein. The processing circuitry 22 of the node 20 may be configured to control the memory 24 of the node 20 to store any messages, requests, responses, indications, information, data, notifications, signals, or similar, that are described herein.

In some embodiments, as illustrated in FIG. 6, the node 20 may optionally comprise a communications interface 26. The communications interface 26 of the node 20 can be connected to the processing circuitry 22 of the node 20 and/or the memory 24 of node 20. The communications interface 26 of the node 20 may be operable to allow the processing circuitry 22 of the node 20 to communicate with the memory 24 of the node 20 and/or vice versa. Similarly, the communications interface 26 of the node 20 may be operable to allow the processing circuitry 22 of the node 20 to communicate with a node at an edge of the network and/or any other node of the network. The communications interface 26 of the node 20 can be configured to transmit and/or receive any messages, requests, responses, indications, information, data, notifications, signals, or similar, that are described herein. In some embodiments, the processing circuitry 22 of the node 20 may be configured to control the communications interface 26 of the node 20 to transmit and/or receive any messages, requests, responses, indications, information, data, notifications, signals, or similar, that are described herein.

Although the node 20 is illustrated in FIG. 6 as comprising a single memory 24, it will be appreciated that the node 20 may comprise at least one memory (i.e. a single memory or a plurality of memories) 24 that operate in the manner described herein. Similarly, although the node 20 is illustrated in FIG. 6 as comprising a single communications interface 26, it will be appreciated that the node 20 may comprise at least one communications interface (i.e. a single communications interface or a plurality of communications interface) 26 that operate in the manner described herein. It will also be appreciated that FIG. 6 only shows the components required to illustrate an embodiment of the node 20 and, in practical implementations, the node 20 may comprise additional or alternative components to those shown.

Any other nodes referred to herein may comprise the same components of the node 20, as described with reference to FIG. 6.

Figure 7:
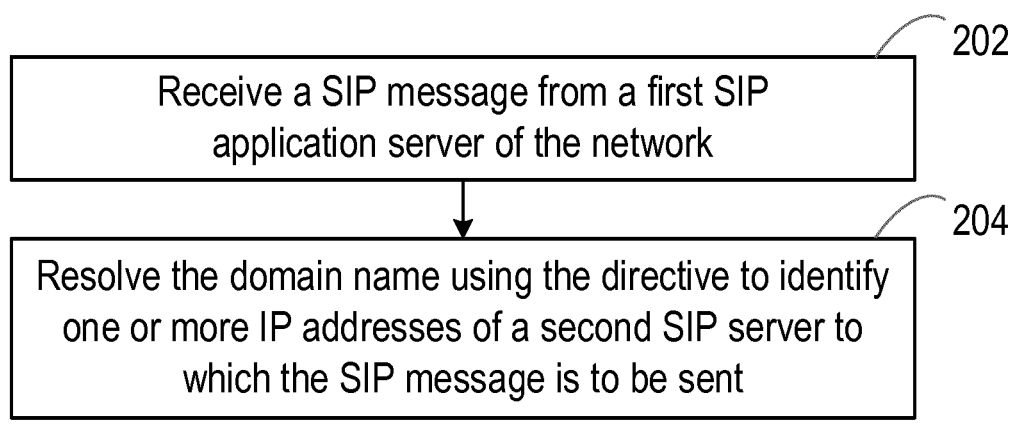
FIG. 7 is a block diagram illustrating a method performed by a node at an edge of a network according to an embodiment.

FIG. 7 is a flowchart illustrating a method performed by a node 20 in accordance with an embodiment. The method is for resolving a domain. The node 20 described earlier with reference to FIG. 6 is configured to operate in accordance with the method of FIG. 7. The method can be performed by or under the control of the processing circuitry 22 of the node 20.

As illustrated at block 202 of FIG. 7, a SIP message is received from a first SIP server 10 of the network. More specifically, the processing circuitry 22 of the node 20 receives the message (e.g. via the communications interface 26 of the node 20). The SIP message may be a SIP signalling message according to some embodiments. As mentioned earlier, the SIP message comprises a domain name and a directive for resolving the domain name to identify one or more IP addresses of a second SIP server to which the SIP message is to be sent. This second SIP server referred to herein can be a target for the SIP message or a next hop for the SIP message. The one or more IP addresses of the second SIP server are associated with the domain name. As also mentioned earlier, in some embodiments, the domain name may be a fully qualified domain name (FQDN). In some embodiments, the directive may be for resolving the domain name to identify one or more IP addresses of more than one second SIP server to which the SIP message is to be sent.

At block 204 of FIG. 7, the domain name is resolved using the directive to identify one or more IP addresses of a second SIP server to which the SIP message is to be sent. More specifically, the processing circuitry 22 of the node 20 resolves the domain name in this way. As mentioned earlier, in some embodiments, the second SIP server may be internal to the network (i.e. may be an iDNS). In other embodiments, the second SIP server may be external to the network (i.e. may be an eDNS). In some embodiments, the domain name may be resolved using the directive to identify one or more IP addresses of more than one second SIP server to which the SIP message is to be sent. In these embodiments, any one or more of the identified SIP servers may be external to the network and/or any one or more of the identified SIP servers may be internal to the network.

As also mentioned earlier, in some embodiments, the directive may be indicative of a domain name system (DNS) server to be queried for the domain name to be resolved. The directive may comprise any one or more of an indication of whether a DNS server to be queried to resolve the domain name is internal to the network or external to the network (e.g. as described in more detail earlier), an address of the DNS server to be queried to resolve the domain name (e.g. as described in more detail earlier), a domain within which the DNS server is to be queried to resolve the domain name (e.g. as described in more detail earlier), and one or more resource records associated with the domain name to be resolved (e.g. as described in more detail earlier). As also mentioned earlier, in some embodiments, the DNS server may be internal to the network. In other embodiments, the DNS server may be external to the network.

Although not illustrated in FIG. 7, in some embodiments, the method may also comprise initiating transmission of the SIP message towards the identified second SIP server. More specifically, the processing circuitry 22 of the node 20 can be configured to initiate (e.g. via the communications interface 26 of the node 20) this transmission of the SIP message. In embodiments where there is more than one identified second SIP server, the method can comprise initiating transmission of the SIP message towards any one or more of the identified second SIP servers.

There is also provided a network, which can comprise at least one first SIP server 10 as described herein and at least one node 20 as described herein at an edge of the network. The network may optionally also comprise one or more other servers and/or one or more other nodes.

Figure 8:
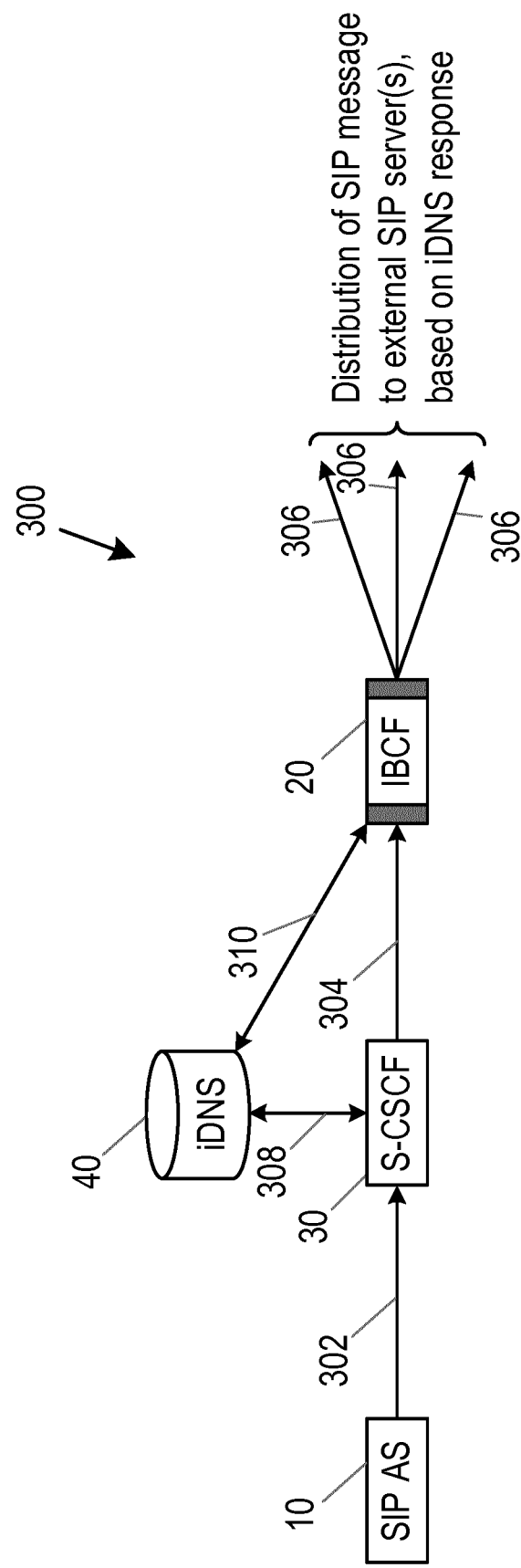
FIG. 8 is a block diagram illustrating a network according to an embodiment.

FIG. 8 is a block diagram illustrating a network 300 according to an embodiment. As illustrated in FIG. 8, the network 300 comprises a first SIP server (e.g. a first SIP AS server) 10 as described earlier with reference to FIG. 4 and a first node (e.g. an IBCF node) 20 as described earlier with reference to FIG. 6 at an edge of the network 300. The first SIP server 10 of the network 300 operates in accordance with the method described earlier with reference to FIG. 5 and the first node 20 of the network 300 operates in accordance with the method described earlier with reference to FIG. 7.

In some embodiments, as illustrated in FIG. 8, the network 300 may also comprise a second node 30. The second node 30 is not at the edge of the network 300. That is, the second node 30 is not a border node. For example, the second node 30 may be a serving call session control function (S-CSCF) node 30. In some embodiments, as illustrated in FIG. 8, the network 300 comprises a domain name server (DNS) or, more specifically, an internal DNS (iDNS) server 40. Although not illustrated in FIG. 8, in some embodiments, the network 300 may also comprises one or more other nodes and/or one or more other servers.

With reference to FIG. 8, the first SIP server initiates transmission of a SIP message 302, 304 towards the first node 20 at the edge of the network 300. The SIP message 302, 304 may be a request comprising a uniform resource identifier (R-URI) according to some embodiments. In some embodiments, the SIP message 302, 304 may be a request for establishment of a session (e.g. a call).

As illustrated in FIG. 8, in some embodiments, the first SIP server may initiate transmission of a SIP message 302, 304 towards the first node 20 at the edge of the network 300 via the second node 30 of the network 300. In other embodiments, the first SIP server may initiate transmission of a SIP message 302, 304 towards the first node 20 at the edge of the network 300 directly. As illustrated in FIG. 8, the first node 20 at the edge of the network 300 receives the SIP message from the first SIP server 10 of the network, e.g. either directly or via the second node 30.

In the embodiment illustrated in FIG. 8, the first SIP server 10 intends to establish a SIP session towards the second SIP server (not illustrated in FIG. 8). The second SIP server is external to the network 300 in the embodiment illustrated in FIG. 8. However, it will be understood that, in other embodiments, the second SIP server may be internal to the network 300. The second SIP server is identified through the domain f.q.d.n.com. The first SIP server wants the first node 20 at the edge of the network 300 to use an iDNS server 40 to resolve this domain. Thus, the first SIP server adds a DNS directive, dns=iDNS, to the domain in the SIP message 302, 304 that is transmitted towards the first node 20 at the edge of the network 300. Thus, the SIP message 302, 304 comprises a domain name (e.g. a FQDN) and a directive for resolving the domain name to identify one or more IP addresses of a second SIP server to which the SIP message is to be sent.

In an embodiment where the SIP message 302, 304 is transmitted towards the first node 20 via the second node 30, the routing of SIP message 302 towards the second node 30 may be based on the domain of the second node 30, as normal. The SIP message 302 can be a SIP invite request according to some embodiments. The second node 30 may apply normal processing of the SIP message 302.

As illustrated by arrow 308 in FIG. 8, according to some embodiments, this normal processing may include the DNS server resolving the domain to which the SIP message 302 is to be sent. The second node 30 may apply domain resolving of the domain f.q.d.n.com. This domain has the DNS directive dns=iDNS associated with it and thus the second node 30 uses the iDNS server 40 for domain resolving (rather than an eDNS server). As the second node 30 is not a border node, it normally does not apply an eDNS query anyway. Thus, in some embodiments, the second node 30 may ignore the DNS directive in the SIP message 302 from the first SIP server 10. In response to receiving a query from the second node 30, the iDNS server 40 initiates transmission of one or more first resource records towards the second node 30. The second node 30 receives the one or more first resource records. The second node 30 uses the one or more first resource records to route the SIP message 304 comprising the domain name (e.g. a FQDN) and the directive for resolving the domain name towards the first node 20 at the edge of the network 300.

The first node 20 at the edge of the network 300 receives the SIP message 304 comprising the domain name (e.g. a FQDN) and the directive for resolving the domain. The first node 20 at the edge of the network 300 resolves the domain name using the directive to identify one or more IP addresses of the second SIP server to which the SIP message is to be sent.

In the embodiment illustrated in FIG. 8, the directive is indicative of a DNS server 40 to be queried for the domain name to be resolved, which in this embodiments is an iDNS server. The first node 20 at the edge of the network 300 wants to apply egress routing of the SIP message towards the domain f.q.d.n.com. However, the directive dns=iDNS indicates to the first node 20 that it is to query iDNS for domain resolving. Thus, the first node 20 at the edge of the network 300 queries the iDNS server 40 to resolve the domain name. In response to receiving a query from the first node 20 at the edge of the network 300, the iDNS server 40 initiates transmission of one or more second resource records towards the second node 30.

The first node 20 at the edge of the network 300 receives the one or more second resource records. The one or more second resource records identify one or more IP addresses of a second SIP server. The first node 20 at the edge of the network 300 thus uses the one or more first resource records to route the SIP message 306 towards the identified second SIP server. As illustrated in FIG. 8, the first node 20 at the edge of the network 300 initiates transmission of the SIP message 306 towards the identified second SIP server. The first node 20 at the edge of the network 300 may apply distribution of the SIP session establishment to the second SIP server as normal, which may include caching of resource records, load sharing, failover (e.g. to the next IP address, such as when two or more IP addresses are received), and/or quarantining (e.g. of IP addresses).

Examples of the SIP message 302 from the first SIP server 10 to the second node 30, the SIP message 304 from the second node 30 to the first node 20, and the SIP message 306 from the first node 20 towards the second SIP server are, as follows:

Message 302:
 Invite srp:+1-800-1234@f.q.d.n.com; dns=iDNS SIP/2.0
 Route: <s-cscf.operator.com>; lr
Message 304:
 Invite sip:+1-800-1234@f.q.d.n.com; dns=iDNS SIP/2.0
Message 306:
 Invite sip:+1-800-1234@f.q.d.n.com; dns=iDNS SIP/2.0

In some embodiments, for other egress routing cases, the SIP message 302, 304 may not contain the directive. In those cases, the first node 20 at the edge of the network 300 may query an eDNS as normal.

The technique described herein can thus deal with the selection of a DNS server for domain resolving. Within a communication services environment, functional entities need to apply domain resolving to send signalling messages towards entities contained within the same communication services environment or towards entities outside the communication services environment. Depending on the destination of the message, the domain resolving may (have to) be done through an iDNS server or through an eDNS server. The technique described herein can thus be advantageous in such a communication services environment.

According to the disclosure, the processing circuitry 12 of the first SIP server 10 that initiates routing of a SIP message towards an (e.g. external) second SIP server includes in the message a domain name (e.g. assigned_domain) for routing and also a directive for resolving the domain name. This directive provides input to the process in the first node 20 at the edge of the network (e.g. an IBCF) for domain resolving, e.g. for selecting a DNS server to use to resolve the domain.

In an example scenario in which this can be used, a SIP session is to be established from an IMS domain towards an external SIP server and the routing of this SIP session is based on a domain that is assigned internally in this IMS domain and is not known outside the IMS domain. According to the disclosure, the resolving of this domain can occur in the iDNS server of this IMS domain. It will be understood that other example scenarios are also possible.

Figure 9:
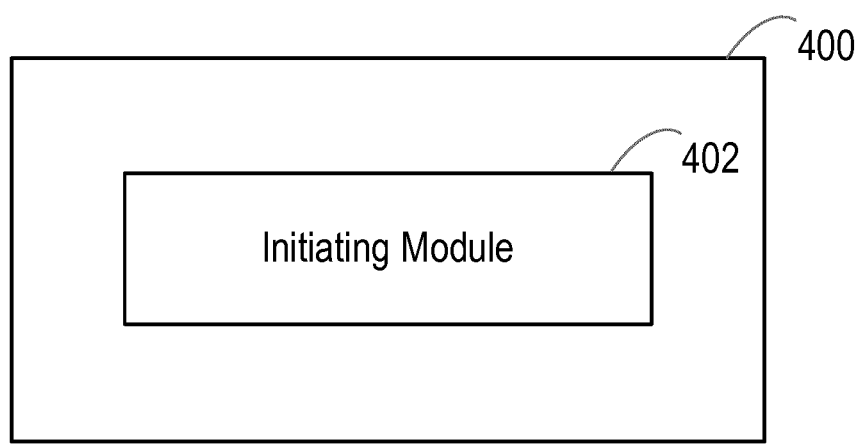
FIG. 9 is a block diagram illustrating a first session initiation protocol server of a network according to an embodiment.

FIG. 9 is a block diagram illustrating a first SIP server 400 of a network in accordance with an embodiment. The SIP server 400 comprises an initiating module 402 configured to initiate transmission of a SIP message towards a node at an edge of the network. The SIP message comprises a domain name and a directive for resolving the domain name to identify one or more IP addresses of a second SIP server to which the SIP message is to be sent. The SIP server 400 may operate in the manner described herein.

Figure 10:
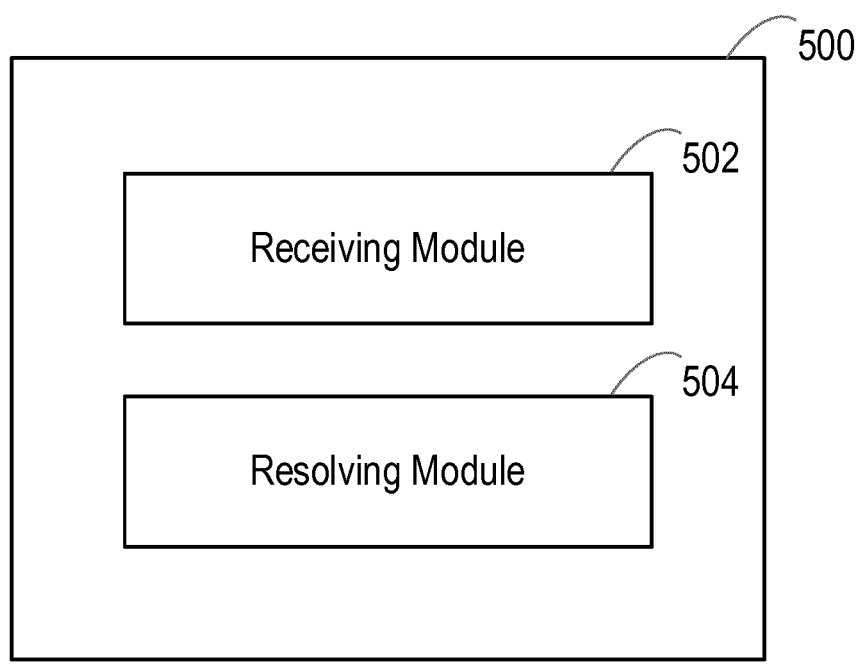
FIG. 10 is a block diagram illustrating a node at an edge of a network according to an embodiment.

FIG. 10 is a block diagram illustrating a node 500 at an edge of a network in accordance with an embodiment. The node 500 comprises a receiving module 502 configured to receive a SIP message from a first SIP server of the network. The SIP message comprises a domain name and a directive for resolving the domain name. The node 500 comprises a resolving module 504 configured to resolve the domain name using the directive to identify one or more IP addresses of a second SIP server to which the SIP message is to be sent. The node 500 may operate in the manner described herein.

There is also provided a computer program comprising instructions which, when executed by processing circuitry (such as the processing circuitry 12 of the first SIP server 10 described earlier or the processing circuitry of the node 20 described earlier), cause the processing circuitry to perform at least part of the method described herein. There is provided a computer program product, embodied on a non-transitory machine-readable medium, comprising instructions which are executable by processing circuitry (such as the processing circuitry 12 of the first SIP server 10 described earlier or the processing circuitry of the node 20 described earlier) to cause the processing circuitry to perform at least part of the method described herein. There is provided a computer program product comprising a carrier containing instructions for causing processing circuitry (such as the processing circuitry 12 of the first SIP server 10 described earlier or the processing circuitry of the node 20 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

The server and/or node functionality described herein can be performed by hardware. Thus, any one or more servers described herein can be a hardware server and/or any one or more nodes described herein can be a hardware node. However, it will also be understood that at least part or all of the server and/or node functionality described herein can be virtualized. For example, the functions performed by any one or more servers described herein can be implemented in software running on generic hardware that is configured to orchestrate the server functionality and/or the functions performed by any one or more nodes described herein can be implemented in software running on generic hardware that is configured to orchestrate the node functionality. Thus, in some embodiments, any one or more servers described herein can be a virtual server and/or any one or more nodes described herein can be a virtual node. In some embodiments, at least part or all of the server functionality described herein and/or at least part or all of the node functionality described herein may be performed in a network enabled cloud. The server functionality described herein may all be at the same location or at least some of the server functionality may be distributed. Similarly, the node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically.

Thus, in the manner described herein, there is advantageously provided an improved technique for domain resolving. The first SIP server 10 described herein has the flexibility to use domain names for message routing, whereby the first SIP server 10 can provide a directive for use in resolving the domain name. This can be advantageous, for example, in communication service networks, e.g. IP communication service networks, such as a hosted IMS service platform.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a first session initiation protocol (SIP) server of a network, the method comprising:
   initiating transmission of a SIP message towards a node at an edge of the network, the SIP message comprising a domain name and a directive, the directive including information associated with a domain name system (DNS) server, the information being processed by the node to determine the DNS server for resolving the domain name to identify one or more internet protocol (IP) addresses of a second SIP server to which the SIP message is to be sent, the DNS server associated with the information of the directive being:
   a different DNS server than that derivable from the domain name of the SIP message.

2. The method of claim 1, wherein:
   the second SIP server is internal to the network; or
   the second SIP server is external to the network.

3. The method of claim 1, wherein:
   the directive is indicative of the DNS server to be queried for the domain name to be resolved.

4. The method of claim 1, wherein:
   the directive comprises any one or more of: an indication of whether the DNS server to be queried to resolve the domain name is internal to the network or external to the network; an address of the DNS server to be queried to resolve the domain name; a domain within which the DNS server is to be queried to resolve the domain name; and
   one or more resource records associated with the domain name to be resolved.

5. The method of claim 3, wherein:
   the DNS server is internal to the network; or
   the DNS server is external to the network.

6. The method of claim 1, wherein:
   the domain name is a fully qualified domain name, FQDN.

7. A first SIP server of a network, wherein the first SIP server comprises processing circuitry and memory storing instructions for execution by the processing circuitry, whereby the first SIP server is configured to:
   initiate transmission of a SIP message towards a node at an edge of the network, the SIP message comprising a domain name and a directive, the directive including information associated with a domain name system (DNS) server, the information being processed by the node to determine the DNS server for resolving the domain name to identify one or more internet protocol (IP) addresses of a second SIP server to which the SIP message is to be sent, the DNS server associated with the information of the directive being:
   a different DNS server than that derivable from the domain name of the SIP message.

8. The first SIP server of claim 7, wherein the directive comprises any one or more of: an indication of whether the DNS server to be queried to resolve the domain name is internal to the network or external to the network; an address of the DNS server to be queried to resolve the domain name; a domain within which the DNS server is to be queried to resolve the domain name; and one or more resource records associated with the domain name to be resolved.

9. A method performed by a node at an edge of a network, the method comprising:
   receiving a session initiation protocol (SIP) message from a first SIP server of the network, the SIP message comprising a domain name and a directive, the directive including information associated with a domain name system (DNS) server,
   processing the information included in the directive to determine the DNS server for resolving the domain name, the DNS server for resolving the domain name being:
   a different DNS server than that derivable from the domain name of the SIP message; and
   resolving the domain name using the directive to identify one or more internet protocol (IP) addresses of a second SIP server to which the SIP message is to be sent.

10. The method of claim 9, the method comprising:
    initiating transmission of the SIP message towards the identified second SIP server.

11. The method of claim 9, wherein:
    the second SIP server is internal to the network; or
    the second SIP server is external to the network.

12. The method of claim 9, wherein:
    the directive is indicative of the DNS server to be queried for the domain name to be resolved.

13. The method of claim 9, wherein:
    the directive comprises any one or more of an indication of whether the DNS server to be queried to resolve the domain name is internal to the network or external to the network; an address of the DNS server to be queried to resolve the domain name; a domain within which the DNS server is to be queried to resolve the domain name; and one or more resource records associated with the domain name to be resolved.

14. The method of claim 12, wherein:

the DNS server is internal to the network; or the DNS server is external to the network.

15. The method of claim 9, wherein:

the domain name is a fully qualified domain name, FQDN.

16. A node at an edge of a network, wherein the node comprises processing circuitry and memory for storing instructions for execution by the processing circuitry, whereby the node is configured to:

receive a session initiation protocol (SIP) message from a first SIP server of the network, the SIP message comprising a domain name and a directive, the directive including information associated with a domain name system (DNS) server, process the information included in the directive to determine the DNS server for resolving the domain name, the DNS server for resolving the domain name being:

a different DNS server than that derivable from the domain name of the SIP message; and resolve the domain name using the directive to identify one or more internet protocol (IP) addresses of a second SIP server to which the SIP message is to be sent.

17. The node of claim 16, wherein the directive comprises any one or more of: an indication of whether the DNS server to be queried to resolve the domain name is internal to the network or external to the network; an address of the DNS server to be queried to resolve the domain name; a domain within which the DNS server is to be queried to resolve the domain name; and one or more resource records associated with the domain name to be resolved.

* * * * *